(No Model.)

J. CAMPBELL & D. H. KELLEY.
STEAM SHOVEL.

No. 558,896. Patented Apr. 21, 1896.

WITNESSES
J. M. Dolan.
N. G. Mayrhofer

INVENTORS
Jeremiah Campbell
Daniel H. Kelley
by their Atty
Clarke & Raymond

UNITED STATES PATENT OFFICE.

JEREMIAH CAMPBELL AND DANIEL H. KELLEY, OF CHELSEA, MASSACHUSETTS.

STEAM-SHOVEL.

SPECIFICATION forming part of Letters Patent No. 558,896, dated April 21, 1896.

Application filed January 19, 1895. Serial No. 535,496. (No model.)

*To all whom it may concern:*

Be it known that we, JEREMIAH CAMPBELL and DANIEL H. KELLEY, citizens of the United States, residing at Chelsea, in the county of Suffolk and State of Massachusetts, have invented a new and useful Improvement in Steam-Shovels, of which the following is a full, clear, and exact description, reference being had to the accompanying drawings, forming a part of this specification, in explaining its nature.

The invention is in some respects an improvement upon that described in the application of Jeremiah Campbell for methods of handling coal, of even date herewith, Serial No. 535,479. In said application there is described a trolley for transferring horizontally a steam-shovel from one location to another. The steam-shovel being suspended from the trolley by its actuating-ropes, the closing and hoisting and holding-on ropes pass over rolls or drums carried by the trolley and extend to their respective operating-drums. In the operation of the shovel and trolley the shovel after taking its load is lifted quite closely to the trolley and is then transferred by it to the place of delivery, and during the movements of lowering, lifting, and transferring the shovel there is danger of the twisting of the ropes by the turning of the shovel, and it is therefore desirable that the shovel should be so held in relation to the trolley that the turning tendency be prevented. This result we have accomplished, first, by providing the trolley with an extension preferably running backward, and, second, connecting the shovel with such extension by means of a positioning chain or rope which is automatically controlled, as will be hereinafter indicated.

Figure 1:
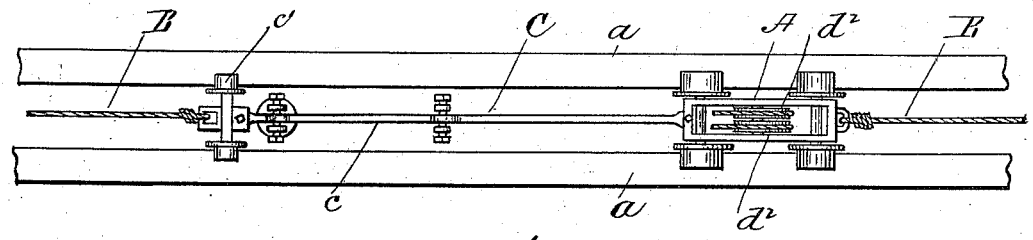
Figure 2:
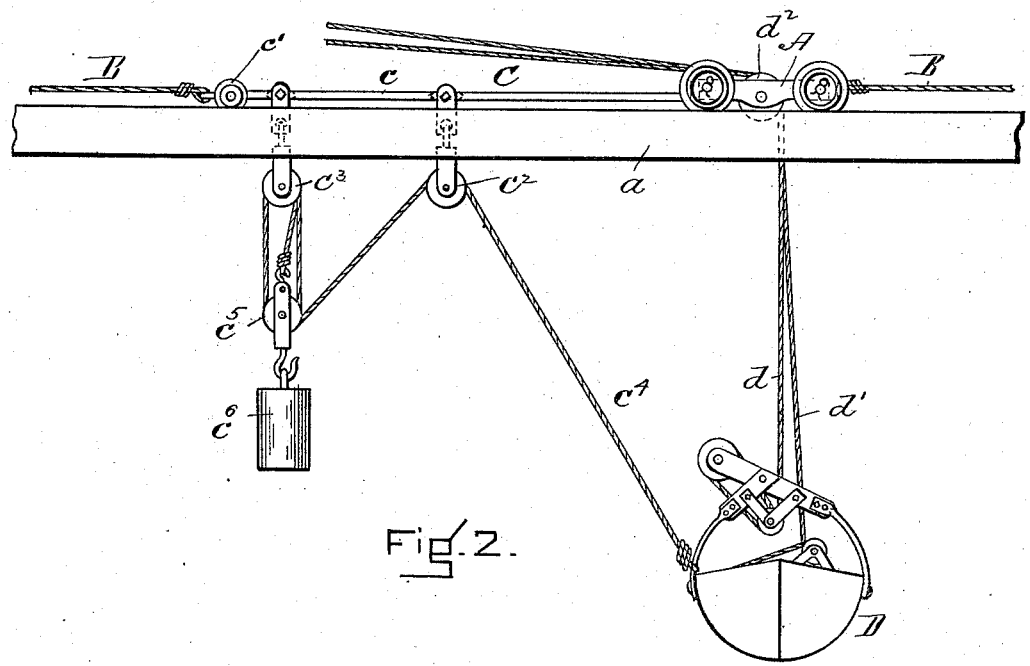

In the drawings, Figure 1 is a view in plan of the trolley and trolley-tracks. Fig. 2 is a view in elevation, showing the trolley, the shovel, and its controlling or positioning device.

The trolley A, its tracks $a$, and trolley-rope B are like those of the application referred to. There is attached to the trolley A an extension C, comprising in substance a bar $c$ and rolls $c'$, which run on the trolley-track. This bar preferably is pivoted to the rear of the trolley, and it supports two pulleys $c^2$ $c^3$.

The shovel D is represented as suspended from the trolley A by the closing and hoisting rope $d$ and the holding-on rope $d'$, which pass over the rolls $d^2$ of the trolley and extend to the winding-drums of the engine. The shovel also has the steadying-rope $c^4$, attached to its side and extending over the pulley $c^2$ and about the pulleys $c^5$ $c^3$, the pulley $c^5$ carrying a weight $c^6$. In some instances the pulleys $c^3$ $c^5$ may be dispensed with; but for the purposes for which the shovel D and trolley A are mainly used it will be desirable to carry the ropes about the pulleys $c^5$ $c^3$ to reduce the travel of the weight $c^6$, for, as a rule, the shovel D has a relatively small lift from the coal or other pile to the trolley-track, and when this take-up provided by the two pulleys $c^3$ $c^5$ is used it is of course important to prevent the rope between them from twisting, and this is accomplished by locating the pulley $c^2$ in front of them, so that the draft shall be from it to the lower one. It will be seen that by this device there is always a strain or draft upon the shovel in one and the same direction, which acts to steady it and prevent it from twisting, and that the same is true of the weight $c^6$ and the rope and its pulley $c^5$ and the pulley $c^3$. It will also be seen that the draw or draft is continuous and automatic whatever the position of the shovel D as to height or of the weight $c^6$ may be.

We would not be understood as confining ourselves to the special type of shovel shown nor to the method of suspending it, as the main object of the invention is to provide means for automatically steadying a steam-shovel and maintaining it steadied while it is being transferred.

It is obvious that where there is sufficient drop for the weight $c^6$ that only the single pulley $c^2$ need be used, the pulleys $c^3$ $c^5$ being employed where the drop is relatively small. It is also obvious that anything drawing and maintaining a constant draft upon the weight end of the rope $c^4$ is the mechanical equivalent for the weight, and I would mention as one such equivalent a winding-drum operated by spring-pressure or by any frictional or other device which will cause it to turn with sufficient stress to wind the rope, but which will yield as against the weight of the shovel.

The steadying rope or device may be attached to any part of the shovel by means of an intermediate bridle, if desired.

Of course the trolley-rope B may act as a support for the pulleys $c^2$ $c^3$ in case both are used, or one of them in case one only is employed, in which case it of course is an equivalent for the rearward-extending rod $c$ of the trolley.

It will be observed that the weight acts as an automatic take-up to the straining-draft or steadying-cord $c^4$ and automatically continues at all times stress upon said cord.

We do not broadly claim herein the use of a device for automatically preventing the twisting of the shovel-ropes during the rising and falling movement of the shovel, the same being the invention of the applicant Daniel H. Kelley and being described in his application filed October 19, 1895, Serial No. 566,207. Neither do we claim the use of said device as described in the application of the applicant Jeremiah Campbell, Serial No. 560,989, dated August 30, 1895.

Having thus fully described my invention, I claim and desire to secure by Letters Patent of the United States—

1. The combination in an apparatus of the character described, of a horizontally-running trolley, an automatic loading-shovel of the character specified, horizontally movable in unison with said trolley, one or more ropes for automatically closing, hoisting, sustaining and opening said shovel extending from the shovel to and about the trolley, means independent of the trolley for operating said rope or ropes, and a device for automatically preventing the turning of the shovel and the twisting of the shovel actuating and sustaining rope or ropes, comprising a line or rope connected with the side of the shovel having an outwardly-inclined relation to the said shovel operating and sustaining rope or ropes and means for exerting a constant stress or pull upon said line or rope which means are horizontally moved in unison with the trolley, substantially as described.

2. The combination of a transferring-trolley A having the extension C, the shovel D suspended from the trolley, the pulley $c^2$ carried by the trolley extension, a steadying-rope attached to the side of the shovel and extending over the said pulley $c^2$, and a weight $c^6$ to which the rope is attached, as and for the purposes described.

3. The combination of a transferring-trolley A, its extension, the pulleys $c^2$, $c^3$ carried thereby, the pulley $c^5$, the weight $c^6$ suspended from it, the shovel D suspended from the trolley, the steadying-cord $c^4$ attached to the side of the shovel extending over the pulley $c^2$ and about the pulleys $c^5$, $c^3$, as and for the purposes described.

4. The combination of an automatically loading, carrying and dumping shovel of the character specified, a horizontally-carrying trolley, a flexible shovel closing, hoisting, sustaining and opening device extending from a stationary engine over the trolley to the shovel, and an automatic mechanism connected with the side of the shovel for preventing the turning of the shovel and the twisting of the operating and suspending device while the shovel is being moved upwardly, carried horizontally and dropped downwardly, comprising a rope attached to the side of the shovel and leading at an inclined angle therefrom, movable horizontally with the trolley and shovel, and upon which a constant tension is exerted, whereby the shovel and its actuating device are held from twisting, as and for the purposes described.

5. The combination of a shovel D, its flexible suspending and operating ropes, the trolley A, a steadying-rope attached to the shovel and extending at an angle to the trolley extension or rope and movable with the trolley and an automatically-acting take-up movable with the trolley to maintain a constant stress upon said steadying-rope regardless of its length, as and for the purposes described.

JEREMIAH CAMPBELL.
DANIEL H. KELLEY.

Witnesses:
F. F. RAYMOND, 2d,
J. M. DOLAN.